Jan. 3, 1933. A. J. SMITH 1,893,063
APPARATUS FOR CONDITIONING MOLTEN GLASS
Filed July 1, 1930 3 Sheets-Sheet 1

Jan. 3, 1933.          A. J. SMITH          1,893,063
APPARATUS FOR CONDITIONING MOLTEN GLASS
Filed July 1, 1930          3 Sheets-Sheet 3

Witness:
C. Merz

Inventor:
Algy J. Smith
by Brown + Parlow
Attorneys

Patented Jan. 3, 1933

1,893,063

UNITED STATES PATENT OFFICE

ALGY J. SMITH, OF BLOOMFIELD, CONNECTICUT, ASSIGNOR TO HARTFORD-EMPIRE COMPANY, OF HARTFORD, CONNECTICUT, A CORPORATION OF DELAWARE

APPARATUS FOR CONDITIONING MOLTEN GLASS

Application filed July 1, 1930. Serial No. 465,137.

This invention relates to apparatus for conditioning molten glass, particularly for maintaining the glass in a gathering pool for a suction machine in a homogeneous condition.

Various arrangements have been proposed for stirring and/or circulating the glass in a gathering pool, which are intended to operate upon the glass in such a manner that only fresh homogeneous glass is presented to the gathering receptacles. One type of device heretofore proposed for this purpose is known as a skimmer or scraper which serves to remove from the gathering zone chilled portions of glass resulting principally from the contact of the molds with the glass in the gathering pool and from the severing operations. Unless care is taken to free the glass in the gathering zone from such chilled glass, it will be drawn into the molds together with the other glass, and will cause imperfections in the ware.

It is an object of the present invention to provide apparatus of novel character for skimming the glass in the gathering zone of a gathering pool, and which operates in an efficient manner. As a practical matter, the novel apparatus of this invention has advantages over similar arrangements heretofore proposed with respect to the relative simplicity of its construction, which readily permits it to be employed without material alteration in the structure of the container for the gathering pool, or in the adjoining tank structure to which the container is connected, and without requiring any appreciable change in, or addition to, any of the usual types of suction machines which may be used in gathering charges from the gathering pool.

The novel apparatus of the invention may comprise a skimmer which is supported from above the gathering pool, in such a way as to permit free access of the molds to the glass, and which may be operated in synchronism with the movements of the molds so as to skim the glass in the intervals between gathering operations without interfering with the molds. The apparatus may include mechanism for moving the skimmer in an orbital path outwardly, downwardly, and inwardly, to skim the glass and impel it inwardly of the gathering pool and to periodically hold the skimmer in an inwardly retracted position out of the path of the suction molds. Thus, a cycle of operation of the skimmer may take place after each gathering operation of a suction mold and the severing of the glass from the gathered charge, to remove the chilled portions of glass from the gathering zone, and insure the provision of hot homogeneous glass for the oncoming mold.

In order that the invention may be more clearly understood and its manifold advantages appreciated, reference should be had to the accompanying drawings in which apparatus embodying the invention is illustrated.

In said drawings:

Fig. 4 is a view in longitudinal section of a valve embodied in the construction shown in Figs. 1, 2 and 3.

Figure 2:
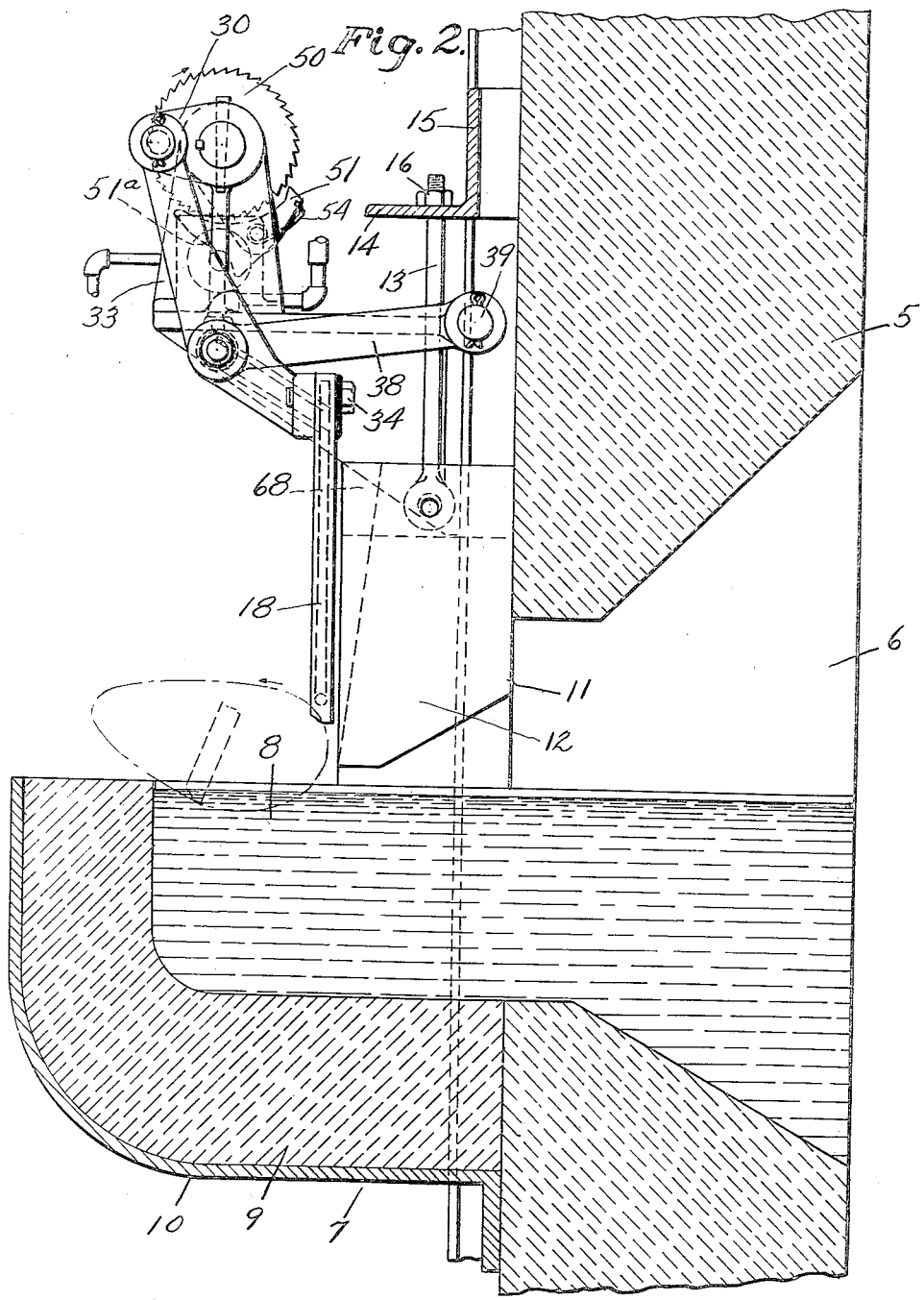
Fig. 2 is a view in vertical section and side elevation of the construction shown in Fig. 1, and taken substantially on the line 2—2 of Fig. 1.

Proceeding now with a detailed description of the apparatus shown in the drawings, the front wall 5 of a glass melting tank, the remainder of which is not shown, has an opening 6 formed therein through which glass flows from the tank into a stationary extension 7 containing the gathering pool 8. The extension 7 may comprise refractory material 9 surrounded by sheet metal 10 as shown in Fig. 2.

The outer end of the opening 6 in the front wall of the tank is partially shut off above the glass by means of a jack-arch designated generally at 11. The jack-arch 11 may comprise a plurality of refractory sections 12 separately supported by rods 13, each of which extends upwardly through a flange 14 of a transverse frame member 15 and is held by a nut 16 screw threaded to the upper end thereof. By means of this construction, the blocks or sections 12 may be separately adjusted.

The construction so far described is similar to that disclosed and claimed in the copending application of Karl E. Peiler, No. 387,285, filed August 21, 1929.

Figure 1:
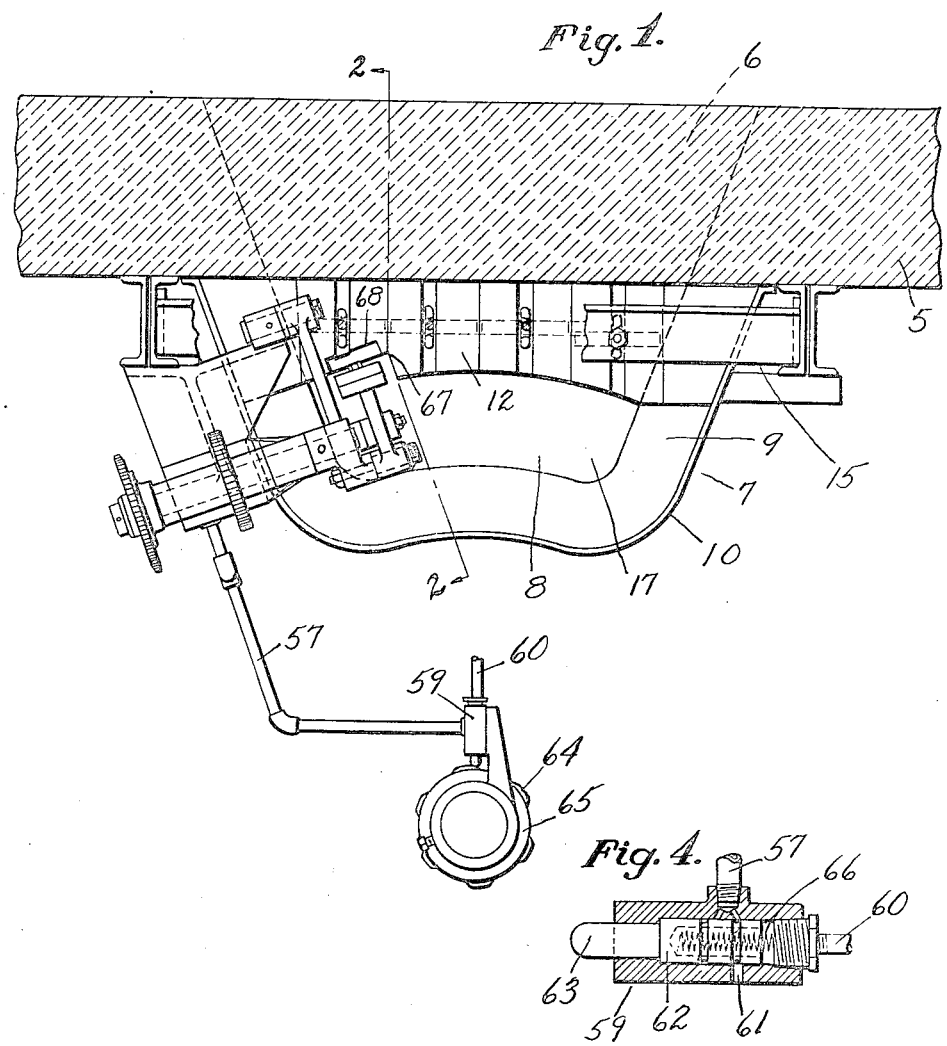
Figure 1 is a view partially in horizontal section and partially in top plan of a portion of a glass melting tank having an extension formed thereon for containing a pool of glass, and embodying apparatus of the invention.

Referring to Fig. 1, it will be observed that the opening 6 in the front wall of the tank, and the container 7, the interior of which forms an extension of said opening, are tapered in such a way that the side walls of the container and of the opening diverge inwardly of the tank. It also will be seen that the front wall of the container is of arcuate shape, and that the jack-arch 11 is shaped accordingly, and moreover is set inwardly with respect to the front of the container, to leave a gathering opening of general segmental shape as indicated at 17, to permit the molds of a suction machine (not shown) to dip into the gathering zone, thereby provided.

Located to one side or near one end of the gathering zone, preferably at the end where the molds leave the gathering zone, is a skimmer 18 which is supported from above the gathering zone by means preferably positioned exteriorly of the tank, and which serves to operate the skimmer to remove chilled portions of glass from the gathering zone.

Figure 3:
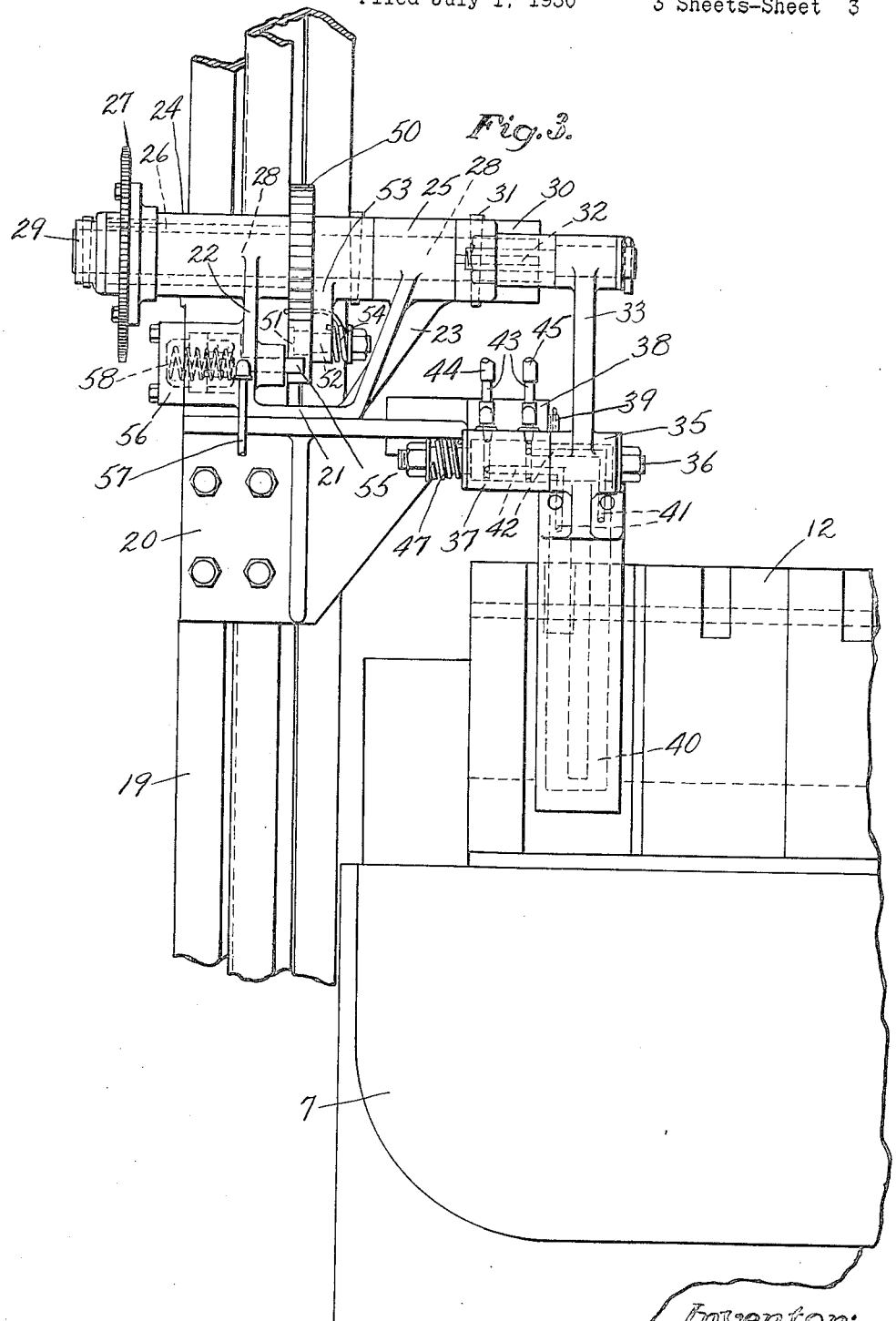
Fig. 3 is a view in front elevation of a portion of the construction shown in Figs. 1 and 2.

Framework surrounding the container or extension 7, and a portion of which is designated 19, Fig. 3, has a bracket 20 secured thereto upon which the skimmer operating mechanism is supported. Said mechanism includes a bracket 21 suitably secured to the top of bracket 20, and comprising a pair of upwardly extending arms 22 and 23 terminating respectively in bearings 24 and 25.

Journaled in the bearing 24 is a bushing 26 which has a sprocket wheel 27 secured to the outer end thereof which may be engaged by a chain, not shown, leading from suitable driving means, also not shown.

A shaft 28 extends through the bushing 26 and also through bearing 25, previously referred to. The bushing 26 is adapted to rotate with respect to the shaft 28, and such shaft is held in position by a collar 29 secured to the outer end thereof, and by a crank arm 30 secured to its inner end and abutting the inner end of bearing 25. The crank arm 30 is held fast on shaft 28 both by a transversely extending key 31, and a longitudinally extending key or feather 32, which serve respectively to prevent longitudinal and rotary movement of the crank arm relative to the shaft 28. Crank arm 30 is pivotally connected at its outer end to the upper end of a lever 33, to the bottom end of which the skimmer 18 is removably secured by means of bolts 34. The supporting and operating structure for the skimmer holds it above one end of the gathering zone, in the position previously described.

Lever 33 is fulcrumed intermediate its ends where it is provided with a hub 35 upon a bolt 36, extending through the hub 35, and through a hub 37 formed on the outer end of a link 38, the inner end of which is pivoted upon a stud 39 carried by the bracket 20.

Because of the fact that the skimmer 18 is supported in a region of relatively high temperature, it is desirable to cool it and to that end, the skimmer has a U-shaped passageway 40 formed therein, the upper ends of which communicate with ducts 41 in hub 35 of lever 33, which ducts in turn are adapted to communicate with similar ducts 42 in hub 37 of lever 38. Ducts 42 have conduits 43 connected thereto to one of which the flexible tube 44 is connected for the supply of cooling water, and to the other of which a flexible tubing 45 is connected for the discharge of such cooling water. By means of the conduits and passageways just described, cooling water supplied to tube 44 circulates through the skimmer, such water being discharged therefrom through the tube 45, as will be understood. Hubs 35 and 37 are held in water-tight engagement by means of a compression spring 47 encircling the outer end of bolt 36, and engaging a collar on said bolt and the outer side of hub 37.

The bushing 26 which preferably is continuously rotated through means connected to sprocket wheel 27, though free to rotate with respect to shaft 28, is connected to and disconnected from said shaft in properly timed intervals, to periodically operate the skimmer 18. The means for connecting the bushing to, and disconnecting it from, the shaft 28 includes a ratchet wheel 50 secured to the bushing and a ratchet 51 which cooperates therewith. The ratchet 51 is pivoted upon a stud bolt 52 extending through a crank arm 53 fastened to shaft 28.

The ratchet 51 yieldingly is held in engagement with the ratchet wheel 50 by means of a torsion spring 54 which encircles a portion of bolt 52 and has one end secured to arm 53, and the other end embracing the ratchet 51. When the ratchet 51 is thus held in engagement with one of the teeth on ratchet wheel 50, driving connection between bushing 26 and shaft 28 is provided, so that rotation of said bushing causes rotation of the shaft, and operation of the skimmer 18.

The ratchet 51 may be disengaged from ratchet wheel 50 at a time when the skimmer is in an inwardly retracted position, to permit the molds of the suction machine to clear the skimmer, by means of a detent 55 which is projected into, and retracted out of, the path of the ratchet by the operation of an air motor 56. When in operative position, detent 55 engages a cam 51a formed on the ratchet 51, removing the ratchet from engagement with the ratchet wheel against the action of spring 54. As a result, the skimmer 18 is held in an inwardly retracted position.

Detent 55 is retracted by the admission of air under pressure to air motor 56 through a conduit 57 connected to the air motor. Said conduit also serves to permit the exhaust of air from the air motor to permit a spring 58 in the motor to move the detent into operative position.

The supply of air pressure and the exhaust thereof through conduit 57 is controlled by a valve 59 of known construction (Figs. 1 and 4) having an air supply conduit 60 connected thereto on an exhaust port 61 formed in its side wall.

As shown in Fig. 4, the valve 59 comprises a ported and grooved piston 62 having a stem 63 formed thereon which protrudes from the valve casing. Valve 59 is positioned to permit the stem 63 of the piston 62 to be periodically engaged and raised by a plurality of cams 64 on a cam shaft 65 suitably driven in synchronism with the suction machine (not shown) and if desired, actually connected to a moving part of the machine itself. The cam 64 operates the valve 59 to periodically admit air under pressure from supply pipe 60 into conduit 57 to retract the detent, and disengagement of cam 64 with the valve stem 63 permits periodic exhaust of air from the motor 56 as a result of which detent 55 is operated to disconnect the ratchet 54 from ratchet wheel 50, at suitably timed intervals. The valve 62 is moved into exhaust position to effect the last described operation of the detent by means of a compression spring 66 in the valve casing.

The rotation of shaft 28 causes oscillation of lever 33 about its fulcrum, and also causes the fulcrum to be oscillated because of its being carried by the link 38. The combined oscillation of lever 33 and the vertical movement of the fulcrum and link 38 about the fixed pivot 39, causes the skimmer 18 to be moved in a path substantially the same as that indicated by the broken line in Fig. 2. Thus the skimmer 18 is moved in an orbital path in a vertical plane outwardly with respect to the gathering pool, downwardly and inwardly into contact with the glass as shown by the dotted line position of the skimmer in Fig. 2, and inwardly and upwardly out of contact with the glass into a position such as that in which the skimmer is shown in full lines in Fig. 2. It is in the latter position that the skimmer preferably is held stationary at timed intervals to prevent it striking the molds.

The mechanism for supporting and operating the skimmer preferably is so arranged that the vertical plane of movement of the skimmer is parallel to the adjoining inwardly diverging side wall of the extension 7. As a result of this arrangement, the chilled glass which is impelled away from the gathering zone by the skimmer, is caused to move away from the gathering zone in a path at the widest possible angle to the path of movement of fresh glass which flows into the gathering zone, to replace the chilled glass which is removed therefrom. This tends to prevent the chilled glass being carried back into the gathering zone. The skimmer not only serves to remove the chilled glass from the gathering zone, but also to set up a circulation of the glass in the gathering pool to cause such chilled glass to be replaced by fresh glass of good quality.

If desired, the extent of inward movement of the skimmer may be increased by cutting away the jack-arch 11 as indicated at 67, Fig. 1, and also by recessing one of the sections 12 of the jack-arch opposite the skimmer, in the manner indicated at 68 in Figs. 1 and 2. It is preferred so to cut away the jack-arch and recess one of the sections 12 thereof, to permit the skimmer 18 to be moved in an orbital path extending inwardly of the pool to the extent shown by the broken line in Fig. 2. However, such alterations are not material and may easily be made.

It is to be especially noted that the supporting and operating mechanism for the skimmer, and the skimmer itself, are wholly outside of the structure, enclosing the glass, thus obviating the necessity of providing openings in such structure through which heat may escape, as are required in the use of similar glass conditioning devices heretofore proposed. Aside from the fact that the cam shaft 65 which times the operation of the skimmer, may be connected to the suction machine, used in conjunction with the apparatus of the invention, the machine may otherwise be employed without change.

It is to be understood that the invention is susceptible of embodiment in other forms of construction than that shown in the drawings, and that various changes may be made in the details of construction of the illustrated embodiment, without departing from the scope of the appended claims.

Having thus described my invention, what I desire to claim and secure by Letters Patent is:

1. In combination with a container for a pool of molten glass, from the surface of which charges of glass are removed by suction in a gathering zone, a skimmer for removing chilled glass from the gathering zone, means for moving said skimmer through a closed path passing through the glass, and means operating in timed intervals for interrupting the movement of said skimmer.

2. In combination with a container for a pool of molten glass from the surface of which charges are removed by suction in a gathering zone, a skimmer having operating mechanism associated therewith for removing chilled glass from the surface of the pool in the gathering zone, a stationary mounting for said skimmer and mechanism positioned above the gathering zone, said mechanism comprising a pivot upon which said skimmer is mounted, means for supporting said pivot for vertical oscillation about a fixed axis, and means for oscillating said skimmer about said pivot, and for oscillating the pivot about which said skimmer oscillates, to move said skimmer into and out of contact with the glass in said gathering pool.

3. In combination with a container for a pool of molten glass from the surface of which charges of glass are removed by suction in a gathering zone, a skimmer for removing chilled glass from the surface of the gathering pool in the gathering zone, a driving member and a driven member for operating said skimmer, to periodically move said skimmer into and out of contact with the glass, and means operating at timed intervals for disconnecting the driving member from the driven member.

4. In combination with a container for a pool of molten glass from the surface of which charges are removed by suction in a gathering zone, a skimmer for removing chilled glass from the gathering zone, a stationary mounting for supporting said skimmer above the gathering pool, means for periodically moving said skimmer into and out of contact with the glass in the gathering pool, and means for periodically interrupting the movement of said skimmer.

5. In combination with a container for a pool of molten glass from the surface of which charges are removed by suction in a gathering zone, a skimmer for removing chilled glass from the gathering zone, means for supporting said skimmer from above the gathering pool, and means for operating said skimmer to move it into and out of contact with the glass, comprising a lever to which said skimmer is connected, a link pivotally connected at one end to said lever and at its other end to a stationary pivot, and means for oscillating and for raising and lowering said lever to oscillate said link and thus to cause the skimmer to be moved in an orbital path into and out of contact with the glass in the gathering pool.

6. In combination with a container for a pool of molten glass from the surface of which charges are removed by suction in a gathering zone, a skimmer having operating mechanism associated therewith for removing chilled glass from the surface of the pool in the gathering zone, a stationary mounting for said skimmer and mechanism positioned above the gathering zone, said mechanism comprising a pivot upon which said skimmer is mounted, means for supporting said pivot for vertical oscillation about a fixed axis, means for oscillating said skimmer about said pivot, and for oscillating the pivot about which said skimmer oscillates, to move said skimmer into and out of contact with the glass in said gathering pool, and means for periodically rendering the last named means inoperative.

7. In combination with a pool of molten glass from the surface of which charges of glass are gathered in a gathering zone, a skimmer and operating mechanism associated therewith, means for permanently supporting said skimmer and mechanism above the pool, said mechanism comprising a link pivoted at one end to a stationary pivot and carrying a horizontal pivot at its other end, a lever mounted intermediate its ends on said horizontal pivot, said skimmer being rigidly connected to one end of said lever, and means connected to the other end of said lever for oscillating and raising and lowering said lever to vertically oscillate said link, thus moving the skimmer in a vertical orbital path.

8. Apparatus according to claim 7 wherein the means for oscillating the lever comprises a driving member, a driven member, and means for periodically connecting and disconnecting said members.

Signed at Hartford, Connecticut this 30th day of June, 1930.

ALGY J. SMITH.